June 15, 1926.

L. W. EGGLESTON

VALVE

Filed April 13, 1921

1,588,532

Inventor
LEWIS W. EGGLESTON
by Gifford & Bull
his Attorneys

Patented June 15, 1926.

1,588,532

UNITED STATES PATENT OFFICE.

LEWIS W. EGGLESTON, OF BUFFALO, NEW YORK, ASSIGNOR TO AMERICAN RADIATOR COMPANY, OF CHICAGO, ILLINOIS, A CORPORATION OF NEW JERSEY.

VALVE.

Application filed April 13, 1921. Serial No. 461,006.

My invention relates to improvements in valves and particularly to relief valves for heating systems.

My invention has more particular reference to air relief valves adapted to relieve the trapped air in heating systems when the steam is turned on and which automatically close, after the air has escaped to prevent the escape of steam from the system.

The invention consists in construction and improvements to be more fully described hereinafter and the novelty of which will be particularly pointed out and distinctly claimed.

For the purpose of disclosing my invention I have illustrated one embodiment thereof in the accompanying drawings, in which—

Figure 1:
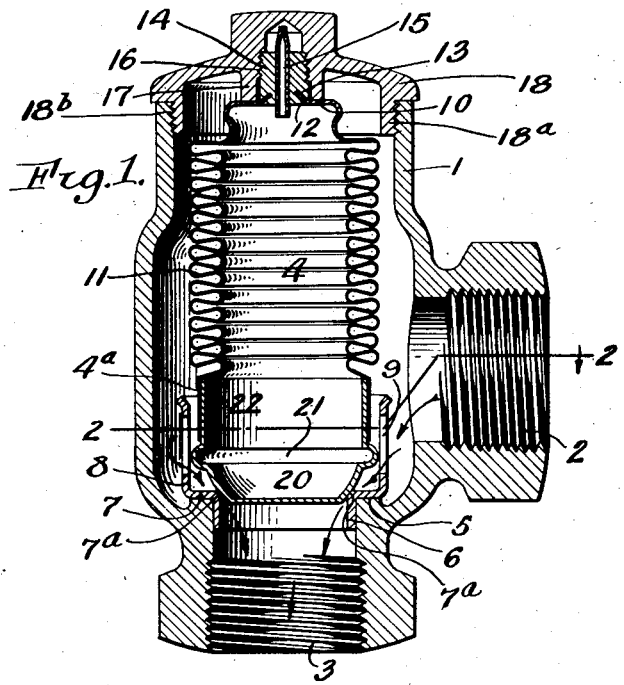
Figure 1 is a longitudinal sectional view of a valve embodying my invention.
Figure 2:
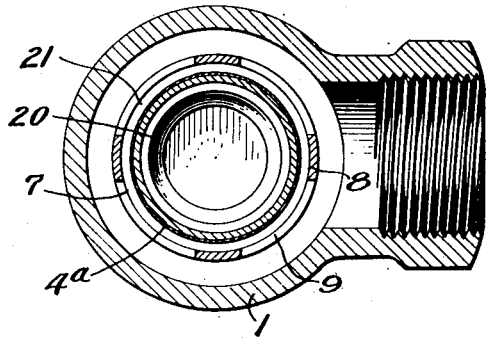
Fig. 2 is a transverse sectional view on the line 2—2 of Fig. 1.
Figure 3:
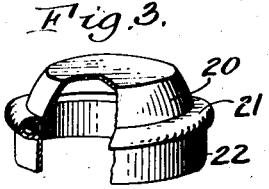
Fig. 3 is a perspective view of the sheet metal valve partly broken away.
Figure 4:
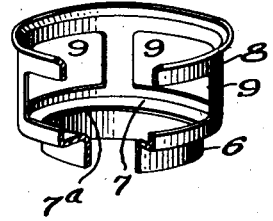
Fig. 4 is a perspective view of the sheet metal valve seat partly broken away.

In the preferred embodiment of the invention illustrated the valve casing 1 which is provided with an inlet port 2 and an outlet port 3 also provides a housing for an expansible-collapsible member 4. In the particular form illustrated, the inlet port 2 is arranged preferably on the side of the valve casing and is internally screw-threaded for connection with the heating system. The outlet port 3 is formed preferably in the bottom of the casing and is likewise internally screw-threaded for suitable connection with a conduit pipe. Surrounding the outlet port there is formed, within the casing, an annular shoulder 5 on which is mounted the valve seat. This valve seat preferably is stamped from a single piece of sheet metal and is provided with a neck 6 adapted to fit within the outlet port opening 3 and with an annular shoulder 7 bearing on the annular shoulder 5, said seat having its inner edge beveled as at 7ª to form the seating portion for the valve, to be presently described. The valve seat is also provided with an annular flange 8 which extends upwardly and forms a guide for the valve. The annular flange has a plurailty of openings 9 formed therein to permit the quick escape of the air through the outlet port.

Within the casing is a resilient expansible-collapsible member 4, said member being of thin metal and provided with a closed end 10 and an open end, the intermediate portion 11 of the member being corrugated whereby the said member is expansible and collapsible lengthwise. At its open end the wall of the member 4 is formed with a cylindrical portion 4ª, for a purpose to be presently described. The closed end 10 has a central annular cone shaped flange 12 which is adapted to engage in an annular seat 13 formed on the lower end of a threaded nut 14, suitable solder being used preferably to make a tight joint between the said nut and flange. Extending through the nut 14 and communicating with the interior of the expansible-collapsible member is a charging tube 15 which, after the expansible-collapsible member has been charged with a volatile liquid adapted to be contained therein, has its upper end pinched together and preferably sealed by soldering, brazing or otherwise. The nut 14 provides a supporting member which is screw-threaded into an interiorly screw-threaded socket 16 formed in the interior of a boss 17 on the cover 18 of the valve casing. The cover 18 has an annular downwardly extending flange 18ª which is exteriorly screw-threaded to engage as at 18ᵇ with an internal screw-thread formed in the top of the casing. The expansible-collapsible member is thus supported by and removable with the cover of the casing.

The open end of the expansible-collapsible member is closed by a valve. This valve is stamped from a single piece of sheet metal and has its lower end 20 substantially sphero-conical shaped so that no matter what the angle of closing may be it will always bear evenly on the beveled edge 7ª of the sheet metal seat heretofore described. Above the sphero-conical portion of the valve the sheet metal of which the same is made, is expanded to form an outwardly projecting annular bead 21 which, co-operating with the inner face of the annular flange 8 of the seat, guides the valve in its movements relative to its seat. Above the bead 21 the valve is formed with a tubular portion preferably in the form of an annular flange or neck 22 which neck fits within the portion 4ª at the open end of the expansible-collapsible member 4, said neck being soldered, brazed or otherwise secured to the portion 4ª to make a gas tight closure.

Due to the fact that the valve is hollow there is formed a well within the valve in which the condensed volatile liquid collects and is held when the apparatus is cold, the valve being preferably so proportioned that the well will be of such capacity as to hold substantially all the volatile liquid with which the expansible-collapsible member is charged.

The length of the expansible-collapsible member is such that when it, and the valves carried thereby are operatively arranged in the casing, the valve will be seated or closed on its seat 7ª when the expansible-collapsible member expands to its limit under its normal or inherent spring action. The expansible-collapsible member is charged with or contains a volatile liquid, and a vacuum is created in said member whereby said member is collapsed against its normal spring tendency to expand, so that after the expansible-collapsible member is sealed, and with the volatile liquid therein cold or condensed, the vacuum created in the expansible-collapsible member will maintain said member collapsed and hold the valve open. As soon, however, as the predetermined operating temperature volatilizes the volatile liquid, pressure is created interiorly of the expansible-collapsible member equal to the exterior pressure, and the normal spring tendency of the expansible-collapsible member will thereupon move the valve to closed position.

In practice I prefer to charge the expansible-collapsible member with more than sufficient quantity of volatile liquid than is necessary when volatilized, to fill it with gas. If the quantity of the volatile liquid were not thus suffiiently large, there would be times, after the steam is turned off and the apparatus allowed to cool, when the volatile liquid would be condensed and trapped in the convolutions of the corrugations and an insufficient amount of liquid would exist in the well formed by the valve. By employing a quantity of charge which is more than sufficient, I insure that sufficient liquid will be contained in the well, after condensation takes place, to insure sufficient evolution of vapor or gas to operate the valve when the steam is turned on and strikes the well.

Assuming that the valve is in closed position when the temperature conditions exist, permitting condensation of the volatilized liquid in the expansible-collapsible member, the vacuum existing therein will permit the member to collapse, thereby moving the valve to open position.

I have found in actual practice that I produce good results by charging the expansible-collapsible member at 70° Fahrenheit temperature with ten cubic centimeters of a volatile mixture containing 85% distilled water and 15% wood alcohol, or approximately 75% distilled water and 25% ethyl alcohol. The expansible-collapsible member is charged with the above mixture and has created therein a vacuum of 15 inches of mercury and when so charged under such a vacuum the valve will close at a temperature of 160° Fahrenheit.

In operation, of the valve when steam is turned on in the system, it forces in front of it any air which is contained in the pipes included in the system and this air passes through the inlet port 2 of the valve casing and out through the outlet port 3. The steam following the air takes a path through the inlet and outlet ports of the valve casing and immediately comes in contact with the hollow valve thereby heating this portion first and consequently heating the volatile liquid therein until said liquid volatilizes and thereby creates sufficient pressure within the expansible-collapsible member to cause the latter to expand and move the valve downwardly until it closes the outlet port. Due to the fact that the condensed volatile liquid is directly in the path of the escaping steam the said liquid is quickly heated and the valve closed promptly. Furthermore, the valve being formed of sheet metal, contains a minimum amount of metal to be heated or cooled before the volatile liquid contained therein can be affected, thereby permitting a rapid response of said liquid to changes in temperature. The valve, being formed of sheet metal, is extremely light and therefore, requires a minimum of power to move it, so that it responds quickly to changes in temperature.

While I have described my valve in particular connection with a steam system, it will be understood that the valve is equally applicable to hot water and other heating systems and may be used in other connections, and while I have illustrated one embodiment of my invention it will be understood that the invention may be embodied in various forms of apparatus and the structure illustrated may be modified without departing from the spirit of the invention as set forth in the appended claims.

Having thus described my invention what I claim as new and desire to secure by Letters Patent is:

1. In a valve, the combination of a valve casing having an inlet port and an outlet port, an expansible-collapsible member in the casing, said member having at one end a cylindrical portion and having an intermediate corrugated portion, a valve seat having a portion seated within one of said ports, said valve seat having an annular seating shoulder and an upwardly-extending cylindrical flange having openings therethrough, and a valve cooperable with the valve seat and consisting of an integral structure including a hollow valve portion in cup form having at one end a cylindrical flange extension telescopically engaged with said cylindrical flange of the expansible-collapsible member and secured thereto, said structure having an external circumferential bead co-operating with the flange on the valve seat to thereby space the valve from said flange.

2. In a valve, the combination of a valve casing having an inlet port and an outlet port, a valve seat at one of said ports, an expansible-collapsible member in the casing, said member having at one end a cylindrical portion and having an intermediate corrugated portion, a valve seat having a portion seated within one of said ports, said valve seat having an annular seating shoulder and an upwardly-extending cylindrical flange having openings therethrough, and a valve consisting of an integral structure including a hollow valve portion in cup form having at one end a sphero-conical portion cooperable with said shoulder, and at the other end having a cylindrical flange extension telescopically engaged with said cylindrical flange of the expansible-collapsible member and secured thereto, said structure having an external circumferential bead between the said sphero-conical portion and the cylindrical flange extension, said bead cooperating with the flange on the valve seat to thereby space the valve from said flange.

In witness whereof, I have hereunto subscribed my name.

LEWIS W. EGGLESTON.